United States Patent
Eriksson

[11] 3,724,660
[45] Apr. 3, 1973

[54] METHOD OF FRACTIONATING WOOD FIBER PULP OR THE LIKE AND DEVICE FOR PERFORMING THE METHOD

[75] Inventor: Erik Folke Eriksson, Johanneshov, Sweden

[73] Assignee: AB Calor & Celsius, Solna, Sweden

[22] Filed: Apr. 22, 1970

[21] Appl. No.: 30,930

[30] Foreign Application Priority Data

Apr. 22, 1969 Sweden .............................5722/69

[52] U.S. Cl. ..................209/250, 209/274, 209/305, 209/265
[51] Int. Cl. ...............................................B07b 1/00
[58] Field of Search......209/305, 306, 250, 254, 273, 209/380, 284, 268, 274, 265, 264, 267

[56] References Cited

UNITED STATES PATENTS

| 1,774,644 | 9/1930 | Gesnel | 209/306 X |
| 3,490,585 | 1/1970 | Gooding | 209/254 X |

FOREIGN PATENTS OR APPLICATIONS

| 20,319 | 1/1910 | Norway | 209/305 |
| 24,592 | 8/1914 | Norway | 209/300 |
| 144,408 | 8/1902 | Germany | 209/306 |
| 171,928 | 11/1956 | Sweden | 209/250 |
| 546,647 | 4/1956 | Belgium | 209/305 |
| 693,671 | 9/1964 | Canada | 209/250 |
| 719,958 | 10/1965 | Canada | 209/250 |
| 749,785 | 1/1967 | Canada | 209/273 |
| 1,128,277 | 4/1962 | Germany | 209/273 |

Primary Examiner—Frank W. Lutter
Assistant Examiner—Robert Halper
Attorney—Spencer & Kaye

[57] ABSTRACT

A method of fractionating a fibrous suspension or the like in which a curved perforated stationary screen and at least one stationary nozzle are utilized to divide the suspension into a fine fraction and a coarse fraction. The nozzle directs the suspension as a spray against an impact surface and in a direction parallel to the concave surface of the screen. Substantially only a fine fraction of the suspension is passed through the perforations in the screen at a portion of the screen removed from the impact surface, while the coarse fraction of the suspension is lead toward a rejection outlet.

A device for performing the fractionating method in which the impact surface is constituted by an imperforate portion of the concave surface of the screen or is constituted by an imperforate shield member positioned within the screen. The device may also include a diverting element associated with the screen which receives a portion of the suspension passing through the screen.

15 Claims, 2 Drawing Figures

INVENTOR.
Erik Folke Eriksson

BY Spencer & Kaye
ATTORNEYS.

METHOD OF FRACTIONATING WOOD FIBER PULP OR THE LIKE AND DEVICE FOR PERFORMING THE METHOD

BACKGROUND OF THE INVENTION

The present invention relates to fractionating wood fiber pulp or similar suspensions with the aid of a curved perforated screen, the pulp being sprayed against the concave side of the screen.

The use of screens of this type has been previously proposed in connection with other materials. The screening effect, however, is exclusively based on the fact that the area of each hole of the screen formed the boundary value between a desired upper dimension for the acceptable or fine fraction and a desired lower dimension for the rejectable or coarse fraction of the pulp. For the purpose of achieving this effect care has been taken to spray the suspension to the greatest possible extent tangentially onto the screen surface.

During investigations for the purpose of developing a screen for fractionating wood pulp into an acceptable or fine fraction which is substantially free from shives and specks and a rejectable or coarse fraction substantially consisting of shives, specks and similar impurities tests have been performed in which the pulp suspension at a concentration of about 2 to 0.2 percent has been sprayed against the inner surface of a cylindrical screen of perforated sheet metal. As a result of these experiments it was possible to eventually arrive at an extremely satisfactory fractionating effect without the slightest tendency towards clogging of the screen holes. This was accomplished by choosing the area of each hole in the screen surface to be greater than the corresponding size of blunt particles and the thickness of elongate particles in the intended coarse fraction of the pulp suspension and by spraying the suspension obliquely against the screen surface.

The physical factors responsible for the separating effect and the absence of clogging of the screen openings have been the object of a physical analysis which has lead to the conclusion that no explanation can be given that is based on any single specific physical factor.

A possible explanation of the fact that shives, i.e., elongate particles pass over and not through the holes, although the thickness of the individual shives is considerably less than the diameter of the hole, may be found in the fact that the shives in the thin liquid layer passes longitudinally over the hole without any possibility of becoming diverted into the screen hole. On the other hand, it is not possible to explain by the same considerations why thick, short particles are passed to rejection along the inner surface of the screen even though the dimensions of the particles would permit the particles to pass through the screen perforations.

During continued investigations it appeared that the portion of the fine fraction passing through the screen in the immediate neighborhood of the spraying impact regions contains a comparatively greater proportion of both shives and specks than a fraction recovered at a greater distance from the spraying region. This observation may support the theory — which however is not to be construed as a limitation of the invention — that the passage conditions for both shives and specks are more favorable within that range of the screen surface where the flow of the suspension is in the form of a spray-induced direction of flow which is oblique in relation to the screen surface. Accordingly, when the screening requirements are severe it is suitable in accordance with the invention to obstruct, reduce or impede the passage of the suspension through the screen or to divert the passing suspension from the spraying on said zone of the screen surface.

SUMMARY OF THE INVENTION

It is, therefore, a general object of the present invention to provide a method and apparatus of fractionating a fibrous suspension into a fine fraction and a coarse fraction.

It is a more specific object of the present invention to provide a method of fractionating a fibrous suspension into a fine fraction and a coarse fraction in which a curved perforated stationary screen and at least one stationary nozzle are utilized with the nozzle directing the suspension as a spray obliquely with respect to the curved screen and against an impact surface associated therewith, and then directing the spray away from the impact surface in a direction parallel to the curvature of the screen so that substantially only a fine fraction of the suspension passes through the perforations in the screen at a portion of the screen removed from the impact surface.

It is another object of the present invention to provide a method of fractionating a fibrous suspension into a fine fraction and a coarse fraction in which a portion of the sprayed suspension is directed away from the impact surface and a portion is directed through the impact surface, with substantially only a fine fraction of the portion directed away from the impact surface passing through the perforations in the screen at a portion of the screen removed from the impact surface and with the remainder of the portion of the suspension directed away from the impact surface and that portion directed through the impact surface being directed to a rejection outlet.

It is yet another object of the present invention to provide a device for fractionating a fibrous suspension into a fine fraction and a coarse fraction including a curved perforated stationary screen and at least one stationary nozzle, with the nozzle oriented with respect to a concave surface of the screen in order to direct the suspension as a spray against an impact surface associated with the screen and defining with the suspension an impact zone and in the direction of the curvature of the screen, and with a fine fraction outlet of the screen being constituted by the perforations in the screen at a portion of the screen removed from the impact zone.

These and other objects are achieved according to the present invention by designing a cylindrical screen for continuous fractionation of wood pulp into a fine fraction and a coarse fraction. The size of the screen holes which are evenly and densely distributed over the screen surface is so chosen that the area of each hole is larger than the corresponding size (the average size if the variations are considerable) of blunt particles and the thickness of elongate particles in the intended coarse fraction. It is not possible to state any exact values for such dimensional limits in relation to hole diameters but it may be assumed that the diameter of the circular holes may be considerably larger than the diameter of spherical particles and the cross sectional area of elongate particles in the intended coarse fraction respectively. Obviously in each case and with due consideration given to the composition of the pulp to be fractionated and the requirements made with regard to the composition of the fine fraction, tests should be performed for obtaining optimum coordination between hole size, spraying pressure, the amount of material sprayed and the concentration of the suspension.

DESCRIPTION OF THE PREFERRED EMBODIMENTS

Figure 1:
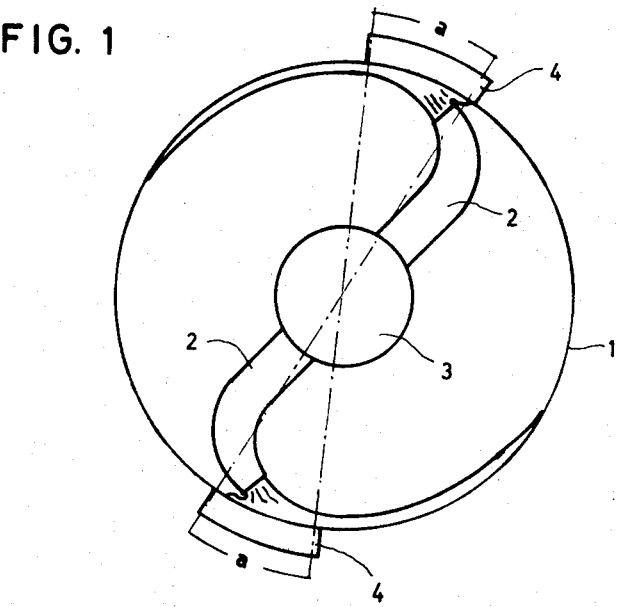
FIG. 1 is a schematic plan view of a cylindrical fractionating screen according to the present invention.

In the embodiment shown in FIG. 1 a fibrous suspension of low concentration of about 2 to 0.2 percent is sprayed against the inner wall of the cylindrical screen 1 from two diametrically opposed nozzles 2 extending from a central supply conduit 3. Obviously, depending on the circumferential extension of the cylinder and its height more than two nozzles may be provided on each level and several sets of nozzles can be arranged on different levels. Due to the oblique direction of spraying the suspension, two different flow patterns may be distinguished in the liquid which within the angular zone *a* has a spray-induced flow direction which is oblique in relation to the screen surface and in a plane normal to the axis of curvature of the screen surface whereas in the zone downstream of the angular zone *a* the flow direction on the screen surface is exclusively determined by the curvature of the screen.

Figure 2:
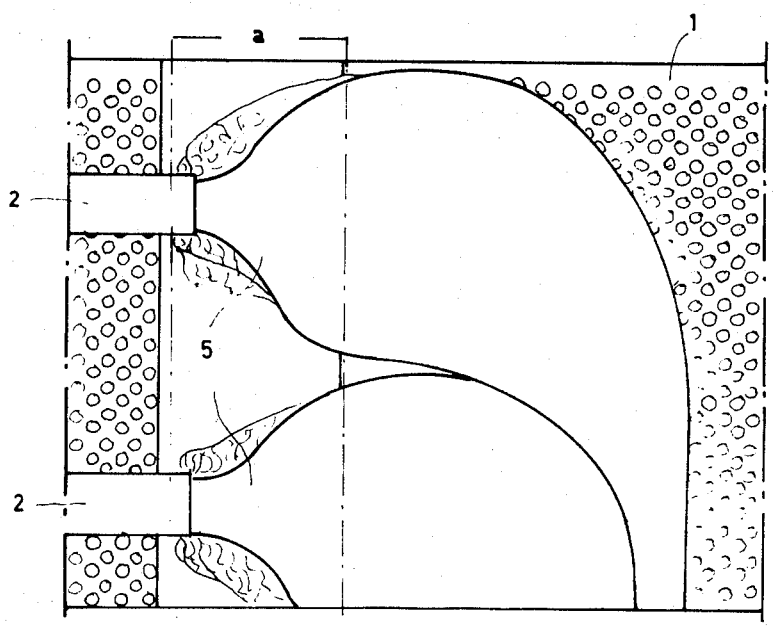
FIG. 2 schematically illustrates on a developed part of the inner surface of a cylindrical screen a spraying pattern applied according to the present invention in spraying the suspension onto the screen surface.

When the screen is vertically disposed, which is not a technical condition but a technological advantage in respect to space requirement and runoff conditions, the suspension is distributed over the screen surface substantially as illustrated in FIG. 2 which means that the spray from the nozzle over a short distance expands towards a greatest width which due to gravity is widened in a downward direction. With decreasing flow velocity the extension of the surface covered by the flow is reduced transversely of the flow direction and the flow-off along the inner screen surface in the final phase will take place practically in a straight downward direction towards a rejection outlet provided at the lower end of the screen.

Depending on the intended degree of fractionation it may be sufficient to reduce the extension of angular zone *a*, for example, by placing the screen in a vertical direction which causes the spraying zone to be widened by a gravity-induced spreading of the liquid in a downward direction or by such operational measures as choice of spraying pressure and spraying rate. If, for example, it is a question of separating shives and specks from a wood fiber suspension it may be fully sufficient to recover the fine fraction which has passed through the screen perforations and which is practically free from shives and specks and simply to collect as coarse the fraction which has not passed through the perforations of the screen and to further treat it. Under more severe fractionating requirements, however, specific measures may be motivated to eliminate or separate from the accepts fine fraction the portion of the through-fraction passing through the holes within the angular zone *a*. According to the embodiment illustrated in FIG. 1 the outer surface of the screen on each of zones *a* is shielded by a separate diverting box 4 which receives the part of the through-flow which in accordance with the observed fractionating pattern contains a relatively great proportion of particles which properly should form part of the coarse fraction. Thus, these boxes 4 at their lower ends may be connected to a conduit which is in communication with the rejection outlet. In respect to varying working conditions and differences regarding the material treated the relative position between boxes 4 and spray nozzles 2 may be adjustable by providing either for shifting adjustability of the boxes along the screen surface or rotational adjustability of the spray nozzle unit within the screen.

In FIG. 2 there is intimated another solution of the problem to eliminate the through-fraction appearing closest to the region of spray impact. In this case the screen within this zone 5 is free from perforations so that passage through the screen of a fine fraction only begins within a range where the flow is completely adapted to the screen surface and no flow components directed obliquely against the screen surface appear any longer. The position of the imperforated screen surface in relation to the zone of spray impact may in this case be adjustable by rotating the screen in relation to the stationary nozzles 2 or by rotating the nozzle unit within the screen.

Among other means, not shown, for improving the fractionating effect there may be mentioned a reduction of the hole area within the spray impact range or the use of a shielding surface provided on the inner side of the screen, which shielding surface may be shiftable.

As it appears to be of great importance for an optimum fractioning effect that the flow direction of the suspension over the screen surface is exclusively determined by the curvature of the screen surface it appears to be important to reduce any possible mutual interference between the sprays coming from nozzles disposed on different levels. In FIG. 2 there is schematically shown a desirable spatial relation between the sprays coming from two nozzles 2 positioned one above the other which sprays will only mix within a range where the flow is substantially downward and where there will be no appreciable passage of material through the screen holes under the action of centrifugal forces.

Finally it may be stated that for the same reason the circumference of the screen and the pressure and velocity of the spray must be chosen so that mutual overlapping between sprays from nozzles situated on the same level will not occur.

Various processes and devices for performing the method of the present invention will become apparent from the appended claims.

What we claim is:

1. In a method for fractionating a fibrous suspension into a fine fraction and a coarse fraction through the use of a curved perforated stationary screen having a concave inner surface, a convex outer surface, and provided with perforations which are larger than the size of the particles constituting the coarse fraction, and at least one stationary nozzle through which the suspension is obliquely directed against a concave surface of the screen, the improvement comprising:

a. spraying the suspension obliquely with respect to the concave surface of the screen to cause the spray to strike the concave surface within an impact zone of the concave surface where the spray has a flow direction component oblique to the concave surface and in a plane normal to the axis of curvature of the concave surface, and to then flow in a direction substantially parallel to the concave surface over a portion thereof outside of the impact zone, where substantially only the fine fraction of the suspension passes through the screen;

b. maintaining at least the coarse fraction of the suspension, after striking the impact zone, separated from the fine fraction passing through the screen beyond the impact zone; and c. collecting the coarse fraction which has been separated from the fine fraction.

2. A method as defined in claim 1 wherein said step of maintaining is carried out by blocking the passage of any suspension through the screen within the impact zone.

3. A method as defined in claim 1 wherein said step of maintaining is carried out by isolating all suspension passing through the screen within the impact zone from the portion of the suspension which passes through the screen beyond the impact zone.

4. The method as defined in claim 3 where the step of isolating is carried out by arranging at least one element outside the screen adjacent the impact zone and wherein the extent of said impact zone is adjustable by adjusting the position of said at least one element for isolating the suspension passing through the screen relative to the screen.

5. A device for fractionating a fibrous suspension into a fine fraction and a coarse fraction, comprising:

a. a curved perforated stationary screen having a concave inner surface and a convex outer surface with the area of each perforation being greater than the size of the particles constituting the coarse fraction;

b. a fine fraction outlet communicating with the convex side of the screen;

c. a coarse fraction outlet communicating with the concave side of the screen and beyond which the coarse fraction which has been separated from the fine fraction is collected;

d. at least one stationary nozzle, through which the suspension is sprayed, oriented with respect to the concave surface of the screen so that the spray will strike the concave surface within an impact zone thereof with a flow direction component oblique to the concave surface and then flow in a direction substantially parallel to the concave surface over a portion thereof outside of the impact zone, where substantially only the fine fraction of the suspension passes through the screen, said component lying in a plane normal to the axis of curvature of the concave surface; and e. diverting means associated with said screen for preventing at least the coarse fraction of the suspension striking said impact zone from communicating with the fine fraction which passes through said screen outside of said impact zone.

6. The device as defined in claim 5, wherein said diverting means is constituted by an imperforate portion of the screen.

7. The device as defined in claim 5, wherein said diverting means comprises means associated with the convex side of the screen and coincident with the extent of said impact zone, and wherein another portion of the suspension passes through the screen at said impact zone into said diverting means.

8. The device as defined in claim 7, wherein the diverting means is adjustable relative to the screen.

9. The device as defined in claim 5, wherein the screen is cylindrical.

10. The device as defined in claim 9, further comprising a plurality of nozzles provided within the cylindrical screen such that the nozzles are evenly distributed about the longitudinal axis of the screen.

11. The device as defined in claim 9, further comprising a plurality of sets of nozzles provided on different levels within the cylindrical screen such that the nozzles are evenly distributed about the longitudinal axis of the screen.

12. The device as defined in claim 5, wherein the screen surface is positioned substantially vertically.

13. The device as defined in claim 5, further comprising a plurality of nozzles provided adjacent each other transversely of the direction of spray.

14. The device as defined in claim 13, wherein the individual nozzles are mutually spaced to such an extent that their individual spray impact zones associated therewith are separate from each other.

15. The device as defined in claim 14, wherein the nozzles are spaced from each other to such an extent that the flows of suspension from the individual nozzles over the greater part of the screen surface are substantially separate from each other.

* * * * *